United States Patent
Schubeck

[15] 3,704,876
[45] Dec. 5, 1972

[54] TRACTION DEVICE

[72] Inventor: Joseph J. Schubeck, Lakewood, Ohio

[73] Assignee: Lakewood Industries, Inc., Cleveland, Ohio

[22] Filed: Aug. 27, 1970

[21] Appl. No.: 67,419

[52] U.S. Cl. .................267/66, 267/52, 180/71, 280/124
[51] Int. Cl. ...................................F16f 1/22
[58] Field of Search ..............267/66, 67, 52; 180/71; 280/124

[56] References Cited

UNITED STATES PATENTS 3,191,711  6/1965  Conner.......................267/66
3,406,957  10/1968  Almquist, Jr. ...............267/67

Primary Examiner—James B. Marbert
Attorney—Teare, Teare & Sammon

[57] ABSTRACT

A traction device for maximizing traction between the wheels of a motor vehicle and a road surface including an elongated lever-like bar and a clamping assembly operably connected thereto for clamping the bar to the rear axle housing of the motor vehicle. The clamping assembly includes a pair of elongated loop-like clamp members adjustably mounted on the bar having one end thereof extending generally perpendicular to the central axis of the bar and the opposite end thereof extending in generally angular relation with respect to the central axis of the bar. A saddle-like bracket member connects the opposite ends of the clamp members together and engages the bar in cradle-like relation to maintain maximum clamping engagement of the bar with the axle housing.

6 Claims, 4 Drawing Figures

PATENTED DEC 5 1972

INVENTOR
JOSEPH J. SCHUBECK
BY
Teare, Teare & Sammon
ATTORNEYS

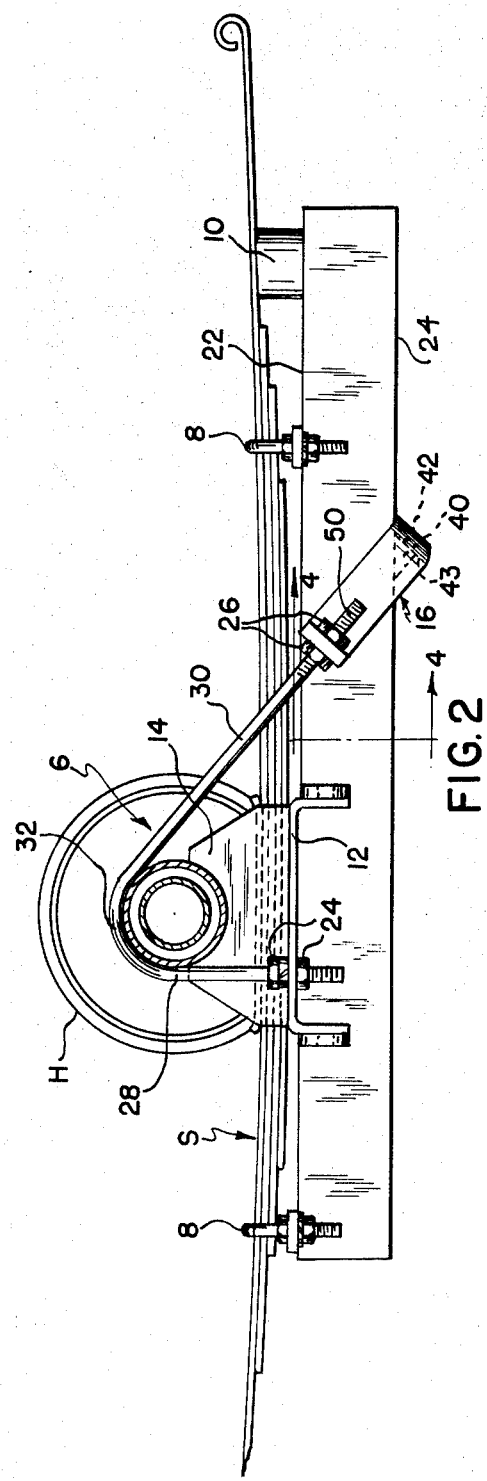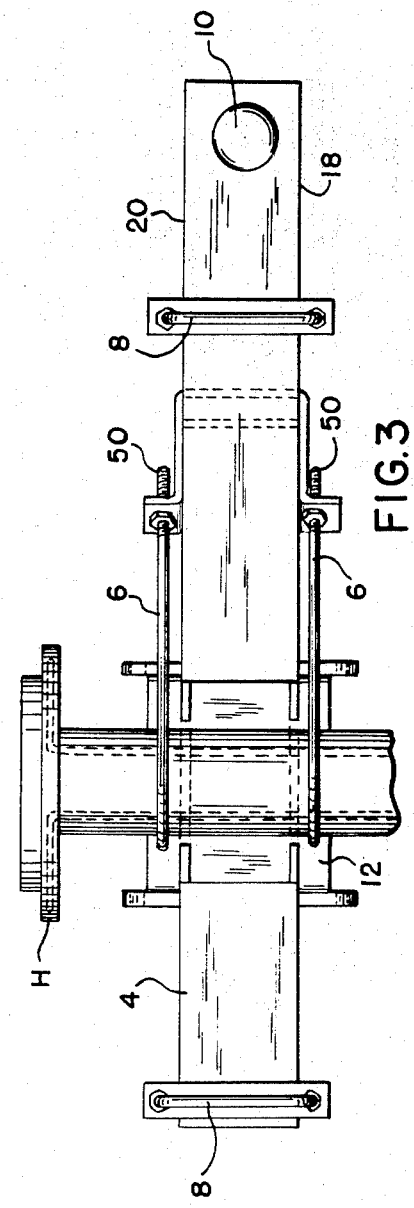

TRACTION DEVICE

BACKGROUND OF THE INVENTION

The present invention relates to traction devices, and more particularly to traction devices adapted for maintaining the wheels of a motor vehicle, such as drag racing car or the like, in contact with the road surface.

Traction devices have been employed for some time in drag racing cars to reduce and/or eliminate wheel hop and enhances weight transfer to the rear wheels of the car, and thus, provide maximum contact or engagement of the wheels of the car with the road surface during acceleration of the car. Normally, a pair of such traction devices are mounted adjacent the respective rear wheels of the car being supported in clamped relation on the rear axle housing. Generally, these devices consist of an elongated support bar which extends laterally beneath the leaf-spring associated with each of the rear wheels, and which is clamped to the rear axle housing by loop-like bolts. These devices have served to prevent the leaf-springs from "wrapping-up", and thus, maintain the leaf-springs in a relatively flexible or "cushioning" condition to prevent wheel hop. Although these former devices have performed satisfactorily to reduce wheel hop and increase traction, other problems have been encountered. For example, these devices have normally been of a welded construction, and thus, the extremely great stresses imposed thereon during acceleration of the car have caused cracking or breaking of welds adjacent the rear axle housing. Recently, these devices have been provided with stress-transferring clamp members which have served to transfer the stress longitudinally along the support bar and away from the rear axle housing. Although this latter arrangement has proven to be effective in transferring the stresses, they have not been found to be entirely satisfactory. More specifically, the stresses imparted to the clamp members have created problems in coupling the terminal ends of the clamp members to the support bar so as to maintain maximum gripping contact thereof with the support bar, and thus, the rear axle housing.

SUMMARY OF THE INVENTION

The present invention contemplates providing an improved device for maintaining the wheels of a motor vehicle, such as a drag racing car or the like, in contact with a road surface upon acceleration of the vehicle. The device includes an elongated, lever-like support bar and a clamping assembly operably connected thereto for clamping the bar to the rear axle housing of the motor vehicle. The support bar includes upper and lower walls and the clamping assembly couples the axle housing to the upper wall thereof. The clamping assembly includes a pair of elongated loop-like clamp members having their opposed ends adjustably mounted on the support bar. One end of each of the clamp members extends generally perpendicular to the central axis of the support bar while the other end of each of the clamp members extends in generally angular relation with respect to the central axis of the support bar. A saddle-like bracket member connects the other ends of the clamping members together and engages the support bar in cradle-like relation. The bracket member is generally U-shaped in configuration including a pair of elongated, laterally extending arms which extend laterally in engaged relation along opposite sides of the support bar having their central axis extending in angular relation with respect to the central axis of the support bar. Further, the central axes of the clamp members adjacent the other ends extend generally parallel to the central axis of the associated arms of the bracket member. The lower ends of the arms are connected by a bight portion extending along the lower wall of the support bar. An abutment member depends outwardly from the lower wall of the support bar for coacting abutting engagement with the bight portion to prevent lateral shifting movement of the bracket member with respect to the central axis of the support bar. Still further, the respective arms extend laterally and outwardly in engaged relation along opposite sides of the bar being adapted for detachable connection to the clamp members.

By the foregoing arrangement, the bracket member is subject to minimum distortion adjacent the under side of the support member, and thus, the bight portion is prevented from bending, such as bowing outwardly away from the bar. In addition, the respective terminal ends of the clamp members terminate adjacent the opposite sides of the support bar resulting in an extremely compact structure having a relatively smooth silhouette along the under side thereof, as compared to other known devices.

BRIEF DESCRIPTION OF THE DRAWINGS

FIG. 2 is a side-elevation view of the traction device illustrated in FIG. 1 showing the device mounted on an axle housing;

FIG. 3 is a top plan view of the traction device of the present invention when looking from the top of FIG. 2.

DESCRIPTION OF THE PREFERRED EMBODIMENT

Figure 1:
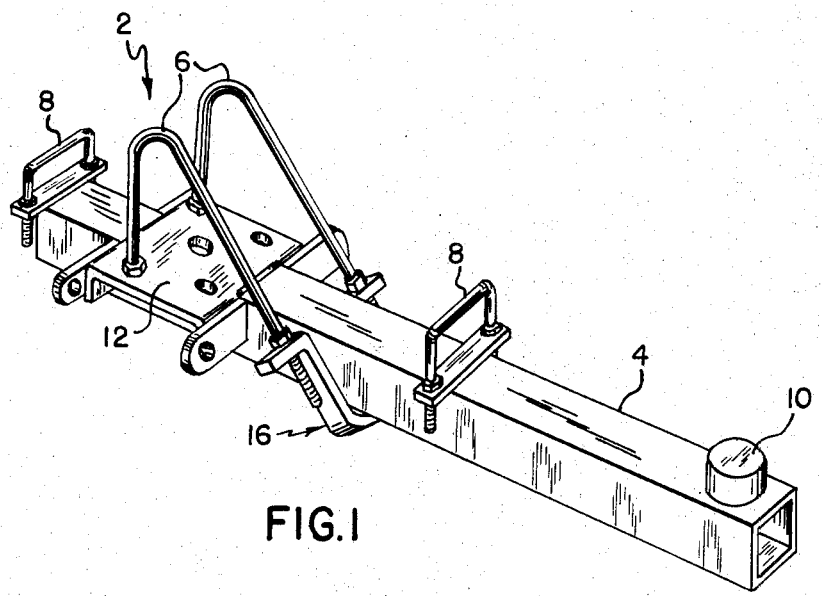
FIG. 1 is a perspective view of the traction device of the present invention.

Referring again to FIG. 1, there is illustrated, generally at 2, a traction device utilizing the present invention. As shown, the device includes an elongated, lever-like support bar 4 which is equipped with clamp members, such as bolts 6, adapted to clamp the support bar onto the rear axle housing H (FIG. 2) of a motor vehicle, such as a drag racing car or the like. The support bar 4 is shown as including hanger-like mounting brackets 8 adapted to receive a leaf-spring S therethrough for aligning the support bar 4 therewith. A snubber member 10 is carried adjacent the forward end of the bar 4 being adapted for abutting engagement with the spring S to reduce distortion or "wrapping-up" thereof during acceleration of the vehicle. As shown, the bar 4 includes a mounting plate 12 adapted for seating engagement with the spring S in the installed position of the device 2. Generally, the housing H includes a downwardly depending support yoke 14 being adapted to coact with the support plate 12 to clamp the spring S therebetween upon tightening of the clamp members 6. As shown, one end of each of the clamp members 6 is connected to the support plate 12 while the opposite end thereof is detachably connected to a saddle-like bracket adapted to receive the support bar 4 in cradle-like relation to assure maximum clamping engagement of the clamp members 6 to the rear axle housing during the acceleration period of the vehicle.

Referring now to FIG. 2, the support bar 4 may be of a hollow construction being generally rectangular in transverse cross-section (FIG. 4) having spaced, generally parallel side walls 18 and 20 and spaced, upper and lower walls 22 and 24, respectively. The support plate 12 is shown as being mounted adjacent the rear end of the bar 4, and may be secured adjacent the upper wall 22 thereof, such as by welding or the like. The bar 4 extends generally laterally and forwardly beneath the spring S with the snubber member 10 engaging the underside thereof. As shown, the snubber member 10 engages the spring S between the forward end thereof and the support plate 12 to resist bending movement of the spring S upon acceleration of the vehicle.

In the form shown, the clamp members 6 are generally inverted J-shaped in configuration each including a generally linearly extending short leg 28 detachably connected to the support plate 12, such as by nuts 24 or the like, and a generally linearly extending long leg 30 being detachably connected to the brackets 16, such as by nuts 26 or the like. The legs 28 and 30 are joined together by a curved bight portion 32 adapted to overly and engage the axle housing H in the installed position of the device 2. Further, the short leg 28 extends generally perpendicular to the lengthwise axis of the bar 4 while the longer leg 30 extends in a generally angular relation with respect thereto. By this arrangement, the support plate 12 will be drawn up into engagement with the underside of the spring S forcing the latter into engagement with the bracket 4 thus clamping the spring in tight seating engagement therebetween. As the snubber member 10 is maintained in contact with the spring S at a spaced distance between the support plate and the forward end of the spring S, the support bar 4 will add substantial rigidity to the spring S to prevent distortion thereto during the acceleration period. The hanger members 8 may be maintained out of contact with the spring S or may be adjusted to be brought into contact therewith to further reduce any distortion in the spring S during the acceleration period, as desired.

Figure 4:
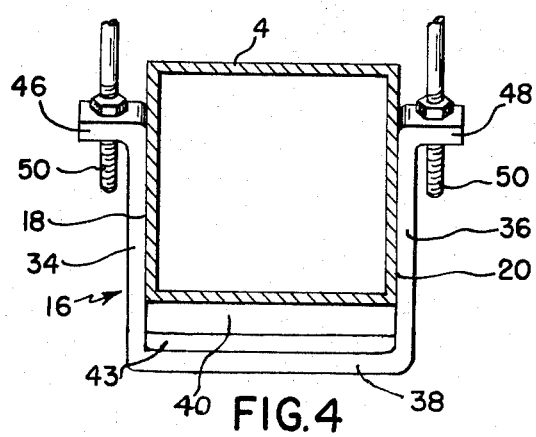
FIG. 4 is a fragmentary, cross-sectional view taken along the line 4—4 of FIG. 2.

Referring now to FIG. 4, the saddle-like bracket 16 is shown as being generally U-shaped in front elevation having a pair of oppositely disposed arms 34 and 36 which extend laterally along the side walls 18 and 20, respectively. The arms 34 and 36 are joined at their lower extremity by a bight portion 38 which is adapted to abuttingly engage the under side of the bar 4. As shown, the bar 4 is provided with a wedge-shaped block 40 having an inclined abutment surface 42 for abutting engagement with the interior surface of the bight portion 38 to limit longitudinal movement of the bracket 16 with respect to the bar 4 in the finally installed position of the device 2.

Preferably, each of the arms 34 and 36 include oppositely disposed lug members 46 and 48, respectively, adapted for connection to the respective legs 30 of the clamp members 6. As shown, the lugs 46 and 48 extend outwardly away from the walls 18 and 20, respectively. By this arrangement, the arms 34 and 36 will always be in engaged relation with the walls 18 and 20 thus preventing them from being bent inwardly toward one another, and therefore, prevent bowing or distortion of the bight portion 38. As can be seen, this arrangement obviates the necessity of the bight portion 38 being physically secured to the block member 40 or if secured thereto, such as by welding or the like, will substantially reduce the likelihood of fracturing or breaking of such welds.

In addition, the arms 34 and 36 of the brackets 16 have their longitudinal axis generally aligned with the longitudinal axis of the respective long legs 30 of the clamp member 6 with the terminal ends 50 of the long legs 30 terminating adjacent the side walls 18 and 20 between the upper and lower walls 22 and 24 resulting in a highly compact structure extremely desirable in those applications having limited space available.

What is claimed is:

1. In a traction device including an elongated, lever-like bar having a clamping assembly connected thereto for clamping said bar to the axle housing of a motor vehicle, said clamping assembly comprising, a pair of elongated loop-like clamp members having their opposed ends adjustably mounted on said bar, one end of each of said clamp members extending perpendicular to the central axis of said bar, the other end of each said clamp members extending in generally angular relation with respect to the central axis of said bar, a saddle-like bracket member connecting said other ends together and engaging said bar in cradle-like relation to maintain maximum clamping engagement of said device with said axle housing, said bracket member is generally U-shaped in configuration including a pair of elongated, laterally extending arms having their central axis extending in angular relation with respect to the central axis of said bar, the lower extremities of said arms being connected by a bite portion, said bite portion extending along the under side of said bar, and an abutment member depending outwardly from said bar for coacting abutting engagement with said bite portion to prevent lateral shifting movement of said bracket member with respect to said bar.

2. In a traction device for use with a motor vehicle of the type including an axle housing and a leaf spring underlying and supporting the axle housing, and wherein said traction device includes an elongated, lever-like bar having an upper surface and an under surface and adapted to underlie and engage said leaf spring in the mounted position thereof, and a clamping assembly mounted on said bar, said clamping assembly comprising, a pair of elongated loop-like clamp members adapted to overlie and engage said axle housing in the mounted position thereof, each of said clamp members having its opposed ends connected to said bar in laterally spaced relation in the lengthwise direction of said bar, the said opposed ends of each of said clamp members extending in their lengthwise direction angularly with respect to the lengthwise direction of said bar and at least one end of said opposed ends of each of said clamp members in their lengthwise direction extending in the lengthwise direction of said bars, a U-shaped bracket member connecting said one end of each said clamp members to said bar, and urging said bar into engagement with said leaf spring in the installed position thereof, said bracket member including a pair of spaced, laterally extending arms each having their lengthwise axis extending upwardly alongside and in angular relation with respect to the lengthwise axis of said bar for connecting said one end of each of said clamp members above the under surface of said bar, one end of each of said arms being connected to a respective one end of each of said clamp members, the opposite ends of each of said arms being connected by a bite portion, and an abutment depending from said bar for coacting, abutting engagement with said bite portion upon clamping engagement of said clamp members on said axle housing to urge said bar into engagement with said leaf spring and to prevent lateral shifting movement of said bracket member with respect to said bar to retain said bar in engagement with said leaf spring in the installed position thereon.

3. In a traction device in accordance with claim 2, wherein, said arms extend upwardly and in engaged relation on opposite sides of said bar.

4. In a traction device in accordance with claim 2, wherein each of said arms include a lug member adjacent the ends remote from said bite portion adapted for detachable connection to a respective one end of each of said clamp members.

5. In a traction device in accordance with claim 4, wherein said lug members are positioned upwardly from the under side of said bar and project outwardly away from one another, and said one end of each of said clamp members terminate above the under side of said bar.

6. A traction device for use with a motor vehicle of the type including an axle housing and a leaf spring underlying and supporting the axle housing comprising, an elongated, lever-like bar adapted to underlie and engage said leaf spring in the mounted position thereof, a clamping assembly mounted on said bar, said clamping assembly including a pair of elongated loop-like members adapted to overlie and engage said axle housing in the mounted position thereof, each of said clamp members having its opposed ends connected to said bar in laterally spaced relation in the lengthwise direction of said bar, the said opposed ends of each of said clamp members extending in their lengthwise direction angularly with respect to the lengthwise direction of said bar and at least one end of said opposed ends of each of said clamp members in their lengthwise direction extending in the lengthwise direction of said bars, a U-shaped bracket member connecting said one end of each said clamp members to said bar, and urging said bar into engagement with said leaf spring in the installed position thereof, said bracket member including a pair of spaced laterally extending arms each having their lengthwise axis extending upwardly alongside and in angular relation with respect to the lengthwise axis of said bar for connecting said one end of each of said clamp members above the under surface of said bar, one end of each of said arms being connected to a respective one end of each of said clamp members, the opposite ends of each of said arms being connected by a bite portion, and an abutment depending from said bar for coacting, abutting engagement with said bite portion upon clamping engagement of said clamp members on said axle housing to urge said bar into engagement with said leaf spring and to prevent lateral shifting movement of said bracket member with respect to said bar to retain said bar in engagement with said leaf spring in the installed position thereon.

* * * * *